Patented May 28, 1946

2,401,272

UNITED STATES PATENT OFFICE 2,401,272

PLASTICIZED CELLULOSE ACETATE COMPOSITION

Joseph L. Quinn, Matawan, N. J., assignor to E. I. du Pont de Nemours & Company, Wilmington, Del., a corporation of Delaware No Drawing. Application October 30, 1944, Serial No. 561,167

7 Claims. (Cl. 106—181)

This invention relates to a plasticized cellulose acetate composition and, more particularly, to a composition especially suited for molding.

Heretofore, cellulose acetate compositions adapted for molding purposes have been made with a wide variety of plasticizers. While many of these compositions give molded articles having quite favorable physical characteristics, there is considerable room for improvement in the resistance of these molded articles upon outdoor exposure and exposure to conditions of high humidity, particularly in resistance to crazing and warpage.

An object of the present invention is to provide new cellulose acetate compositions which, when molded into articles, will exhibit better resistance to crazing on outdoor exposure and greater resistance to warpage and water absorption under conditions of high humidity than compositions that have been known heretofore. A further object is to provide compositions which will give molded articles having improved cold toughness and higher impact strength. Other objects will be apparent from the description of the invention given hereinafter.

The above objects are accomplished according to the present invention by formulating cellulose acetate compositions using dimethyl azelate as a plasticizer. The dimethyl azelate may be used as the sole plasticizer or it may be used in combination with dimethyl or diethyl phthalate. When used alone, it is preferred to employ 20–60 parts of dimethyl azelate per 100 parts of cellulose acetate and, when used in combination with one of the lower alkyl phthalates, to employ 10–35 parts of dimethyl azelate and 10–35 parts of the phthalate, per 100 parts of cellulose acetate.

The compositions of this invention may conveniently be prepared by mixing the cellulose acetate, plasticizer, a volatile solvent, and any modifiers, mold lubricants, coloring matter, and the like, desired on heated rolls, the rolling being continued until a large part of the solvent is removed in accordance with conventional practice. Thereafter, the composition is removed from the rolls, comminuted by means of a cutter such as a Ball and Jewell cutter, and seasoned to remove residual solvent.

It has been discovered that the use of dimethyl azelate as a plasticizer results in a cellulose acetate molding composition which gives molded articles much more resistant to crazing on outdoor exposure than articles molded from cellulose acetate compositions employing lower alkyl phthalate plasticizer which type of plasticizer is generally accepted as the preferred plasticizer heretofore known for cellulose acetate molding compositions. Also, the articles are marked by exceptional cold toughness, impact strength, and resistance to warpage. It has further been discovered that by combining dimethyl azelate with diethyl or dimethyl phthalate, or a mixture of the two, an improved molding composition results in that the phthalate tends to cut down the loss of plasticizer as accelerated aging tests have shown, while the presence of the dimethyl azelate improves greatly the resistance to crazing and warping on exposure of articles molded from such composition.

The present invention is entirely unexpected because it was surprising that dimethyl azelate could be used as a plasticizer for cellulose acetate at all due to its apparent relatively poor compatibility with cellulose acetate. The adjacent azelate homologue, diethyl azelate, is not sufficiently compatible to be used with cellulose acetate unless large amounts of a more compatible plasticizer are used and, rather curiously, when dimethyl azelate is being incorporated in the cellulose acetate by the conventional rolling method, the composition tends to crumble readily, indicating such poor compatibility as to preclude any thought that dimethyl azelate could be used successfully as a plasticizer for cellulose acetate. The actual fact is that, despite these indications to the contrary, articles molded from cellulose acetate plasticized with dimethyl azelate, whether the dimethyl azelate is used alone or in combination with dimethyl or diethyl phthalate, are strain-free and possess remarkably good properties.

The following examples wherein all proportions are by weight unless otherwise stated, illustrate specific formulations of cellulose acetate compositions in accordance with the present invention.

Example I

| | Parts |
|---|---|
| Cellulose acetate | 100 |
| Dimethyl azelate | 32 |
| Stearic acid | 0.75 |
| Denatured ethyl alcohol | 51 |
| Methyl acetate-methanol binary | 13 |

The stearic acid functions as a mold lubricant and it will be understood that the composite volatile solvent of ethyl alcohol and methyl acetate-methanol binary is substantially completely removed in the course of working up the plastic on the rolls and the subsequent seasoning of the granular molding powder after comminution.

Example II

| | Parts |
|---|---|
| Cellulose acetate | 100 |
| Dimethyl azelate | 16 |
| Diethyl phthalate | 16 |
| Stearic acid | 0.75 |
| Denatured ethyl alcohol | 51 |
| Methyl acetate-methanol binary | 13 |

It will be understood that the above examples are merely illustrative of specific compositions according to the present invention which broadly comprises a composition having a cellulose acetate base and dimethyl azelate as a plasticizer. In a preferred form, the plasticizer consists of a combination of dimethyl azelate and either dimethyl or diethyl phthalate, or a mixture of the two.

Those skilled in the art will understand that the compositions of this invention may include modifiers, lubricants, coloring matter, effect materials, and the like. The proportion of plasticizer used will be varied depending upon the particular properties desired in any given instance. However, it has been found that dimethyl azelate, when used alone, should preferably be within the range of 20–60 parts per 100 parts of cellulose acetate and, in combination with a lower alkyl phthalate, should be within the range of 10–35 parts of dimethyl azelate and 10–35 parts of the phthalate per 100 parts of cellulose acetate. While the combination of dimethyl azelate and a lower alkyl phthalate has been found to be particularly advantageous, the dimethyl azelate may also be used in combination with other conventional plasticizers for cellulose acetate. At least 10 parts of dimethyl azelate per 100 parts of cellulose acetate should be used even when another plasticizer is used in conjunction with the dimethyl azelate.

The specific method of preparing these cellulose acetate compositions does not form a part of the present invention. The conventional procedure of working the plastic on rolls is entirely satisfactory but other methods of preparing cellulose acetate molding compositions may be employed. Likewise, the particular volatile solvent which usually is composite of several volatile solvents, does not form a part of the present invention. The volatile solvents heretofore used in the preparation of cellulose acetate molding compositions are, in general, satisfactory and those skilled in the art will appreciate that the volatile solvent is substantially completely removed in any event before the molding composition is ready for use. The finished molding composition may be employed in the various known molding processes such as compression molding, injection molding, and the like, and the particular physical form in which the molding composition will be made, will be governed by the method of molding which is to be employed.

Articles molded from the compositions of the present invention exhibit outstanding superiority over heretofore known molded cellulose acetate articles. They show substantially no indication of crazing or other detrimental results from severe outdoor exposure tests which brought about extensive crazing of articles molded from cellulose acetate compositions employing conventional plasticizers. They have also shown higher impact strength and greater resistance to warpage under conditions of high humidity, and excellent toughness at low temperatures. Further, these compositions are readily molded by any of the conventional procedures and give strain-free articles.

As many apparently widely different embodiments of this invention may be made without departing from the spirit and scope thereof, it is to be understood that the invention is not limited to the specific embodiments thereof except as defined in the appended claims.

I claim:

1. A composition comprising cellulose acetate and a plasticizer therefor comprising dimethyl azelate.

2. A composition comprising cellulose acetate and dimethyl azelate as the sole plasticizer therefor.

3. A composition comprising cellulose acetate and a plasticizer therefor comprising at least 10 parts of dimethyl azelate per 100 parts of cellulose acetate, 4. A composition comprising 100 parts of cellulose acetate and 20–60 parts of dimethyl azelate as the sole plasticizer therefor.

5. A composition comprising 100 parts of cellulose acetate and a plasticizer therefor essentially consisting of 10–35 parts of dimethyl azelate and 10–35 parts of a phthalate from the group consisting of diethyl and dimethyl phthalate.

6. A composition comprising 100 parts of cellulose acetate and a plasticizer therefor essentially consisting of 10–35 parts of dimethyl azelate and 10–35 parts of dimethyl phthalate.

7. A composition comprising 100 parts of cellulose acetate and a plasticizer therefor essentially consisting of 10–35 parts of dimethyl azelate and 10–35 parts of diethyl phthalate.

JOSEPH L. QUINN.